United States Patent [19]
Klatt

[11] Patent Number: 4,780,612
[45] Date of Patent: Oct. 25, 1988

[54] METHOD AND APPARATUS FOR MULTIPLEXING SIGNALS FROM ELECTROMAGNETIC RADIATION DETECTORS

[75] Inventor: Robert W. Klatt, Rancho Palos Verdes, Calif.

[73] Assignee: Hughes Aircraft Company, Los Angeles, Calif.

[21] Appl. No.: 9,153

[22] Filed: Jan. 30, 1987

[51] Int. Cl.$^4$ ............................................. G01J 1/00
[52] U.S. Cl. ............................... 250/336.1; 250/332; 250/338.4
[58] Field of Search ............... 250/332, 334, 336.1, 250/338 R; 370/123, 120, 69.1

[56] References Cited

U.S. PATENT DOCUMENTS

| | | | |
|---|---|---|---|
| Re. 31,295 | 6/1983 | Haley et al. | 370/120 |
| 3,153,761 | 10/1964 | Jankowitz | 250/338 R |
| 3,875,394 | 4/1975 | Shapely | 370/69.1 |
| 4,246,480 | 1/1981 | Clark | 250/332 |

FOREIGN PATENT DOCUMENTS

| | | | |
|---|---|---|---|
| 0055884 | 5/1977 | Japan | 250/338 |
| 2071466 | 9/1981 | United Kingdom | 370/69.1 |

OTHER PUBLICATIONS

Knoll, Glenn F., *Radiation Detection and Measurement* pub. by John Wiley & Sons, New York. 1979, pp. 616-621. QC787.C6K56.

Primary Examiner—Janice A. Howell
Assistant Examiner—William F. Rauchholz
Attorney, Agent, or Firm—Ronald L. Taylor; W. J. Streeter; A. W. Karambelas

[57] ABSTRACT

A method and apparatus for multiplexing signals from electromagnetic radiation detectors is disclosed. The apparatus (10) includes a plurality of elemental detectors (16–32) each of which is being operable to generate an output in response to receipt of electromagnetic radiation. Also provided is a circuit for frequency division multiplexing the output of said elemental detectors.

17 Claims, 2 Drawing Sheets

METHOD AND APPARATUS FOR MULTIPLEXING SIGNALS FROM ELECTROMAGNETIC RADIATION DETECTORS

BACKGROUND OF THE INVENTION

1. Field of the Invention

This invention relates to the field of sensing electromagnetic radiation, and more particularly to a method and apparatus for multiplexing signals from an array of electromagnetic radiation detectors.

2. Description of Related Art

Elemental infrared detectors are often used in conjunction with missiles and night vision systems to sense the presence of electromagnetic radiation having a wavelength of 1–15 μm. These detectors often operate on the principle of photoconductivity, in which infrared radiation changes the electrical conductivity of the material upon which the radiation is incident. Because they are often most sensitive when operating at cryogenic temperatures, photoconductive infrared detectors such as those fabricated from mercury-cadmium-telluride are generally used with a cooling device known as a cryoengine which produces and maintains the necessary operating temperature.

While an array of elemental infrared detectors may be used in an elemental system in which the detectors sense the energy generated by an object space, elemental detectors may also be used in thermal imaging systems. In some real time thermal imaging systems such as forward looking infrared ("FLIR") imaging sensors, moving mirrors are used to scan radiation emitted by the object space across a linear array of elemental detectors. The temporal outputs of the detectors form a two-dimensional representation of the thermal emission from the object space.

To obtain electrical signals from an array of elemental photo-conductive infrared detectors, each elemental detector is generally associated with an individual output conductor. In addition, ground or return paths are also provided, and groups of elemental detectors are usually connected together as well as to common returns. Since the number of elemental detectors in a detector array can often exceed 150 detectors, the number of conductors required to deliver signals to and from the detector array often is greater than 150. The relatively large number of conductors required to be connected to the array tends to increase the amount of undesirable thermal energy which is delivered from the environment to the array through the conductors. Though it is possible to reduce the cross-section of the conductors to minimize the flow of thermal energy to the detectors, the reduction in cross-section is often accompanied by an increase in the resistance of the conductors. Since photo-conductive detectors often have low impedance, the high resistance of the conductors appearing in series with the detectors would cause noise and crosstalk problems. In addition, problems also exist with respect to connecting the relatively large number of conductors to the small closely spaced elemental detectors forming the array.

One method for reducing the number of conductors from elemental detector arrays is to use time division multiplexing in which the signals from two or more detectors are delivered over a common conductor during successive time intervals. However, the use of time division multiplexing often adversely influences the noise performance of the detectors which have signal levels in the order of microvolts. The circuits used to perform time division multiplexing generate noise as they are generally driven by control signals of one volt or greater and cannot be totally isolated from the signal path. The use of amplifiers to reduce the noise associated with time division multiplexing is not generally feasible as the amplifiers often increase the heat load of the system. In addition, while it is possible to use photovoltaic detector arrays with silicon readout arrays which require fewer conductors, it is difficult to manufacture photovoltaic detectors in large quantities which are able to operate in the most desirable spectral region (i.e., 8–12 μm) at easily reached operating temperatures.

SUMMARY OF THE INVENTION

According to the preferred embodiment of the present invention, a method and apparatus for multiplexing signals from electromagnetic radiation detectors is provided. The apparatus includes a plurality of elemental detectors each of which is operable to generate an output in response to receipt of electromagnetic radiation. Also provided is a circuit for frequency division multiplexing the output of said elemental detectors.

BRIEF DESCRIPTION OF THE DRAWINGS

Various advantages of the present invention will become apparent to one skilled in the art upon reading the following specification and by reference to the following drawings in which.

DESCRIPTION OF THE PREFERRED EMBODIMENTS

Figure 1:
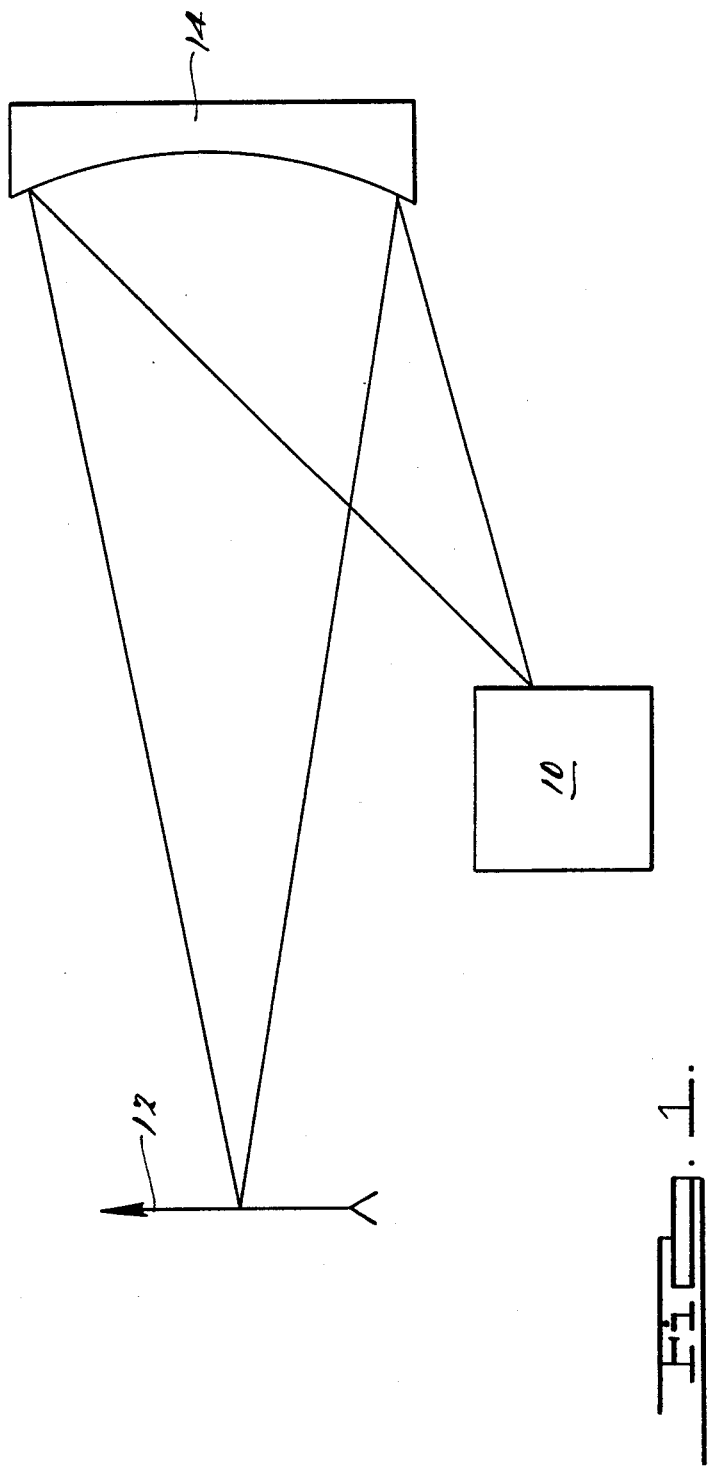
FIG. 1 is a diagrammatic illustration of a thermal imaging system using the apparatus for multiplexing signals made in accordance with the teachings of the preferred embodiment of the present invention.
Figure 2:
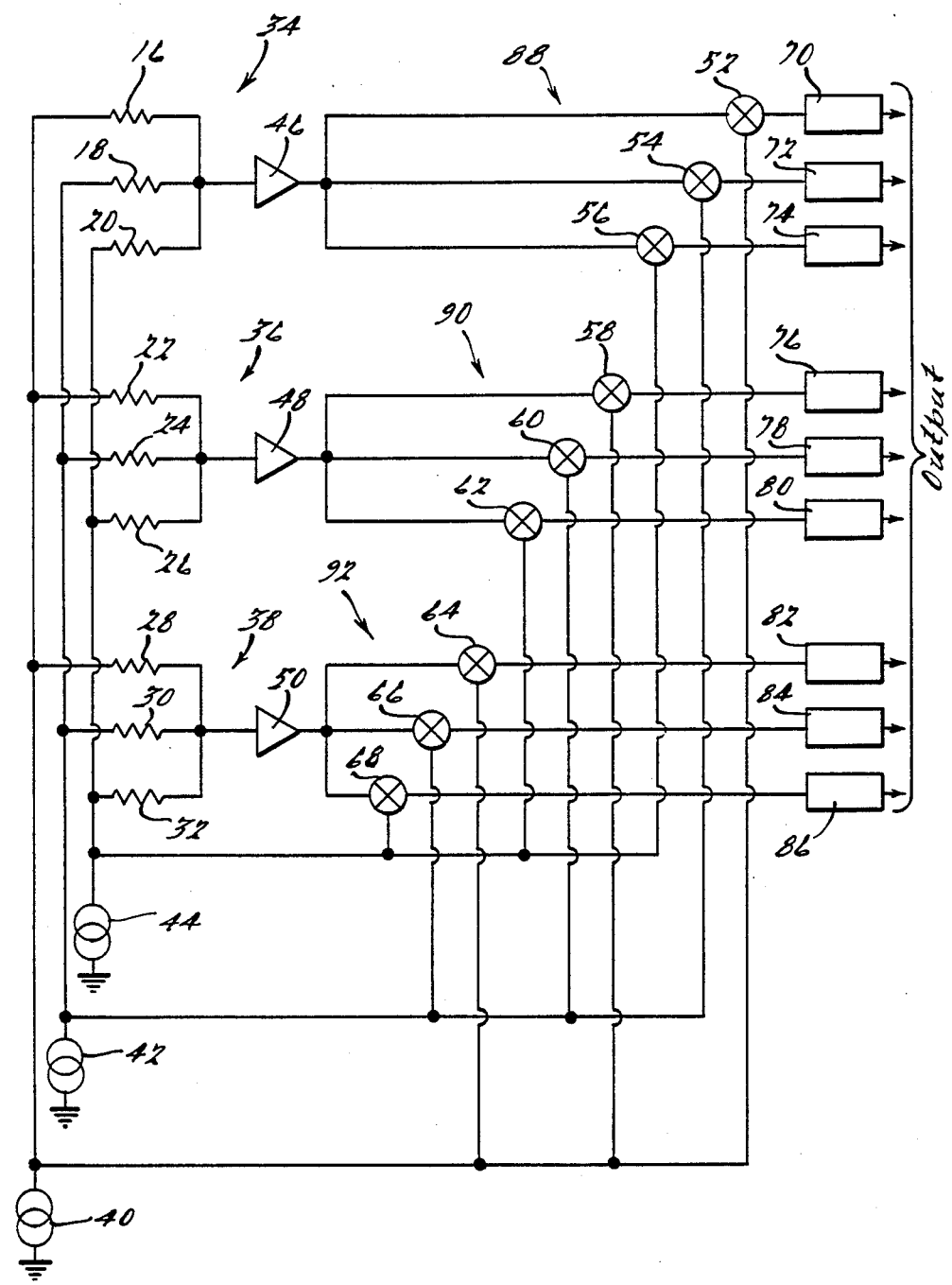
FIG. 2 is a schematic diagram of the apparatus for multiplexing signals from electromagnetic radiation detectors made in accordance with the teachings of the preferred embodiment of the present invention.

Referring to FIG. 1, an apparatus 10 for multiplexing signals from electromagnetic radiation detectors is shown. The apparatus 10 receives infrared radiation from a source 12 in an object space through a re-imaging mirror 14. The re-imaging mirror 14 is used to represent the collecting telescope optics of a thermal imaging system.

To provide means for detecting the electromagnetic radiation delivered by the source 12, the apparatus 10 comprises a plurality of photoconductive elemental detectors 16–32. The photoconductive elemental detectors 16–32 may be fabricated from mercury-cadmium-telluride, though it is to be understood that other suitable materials may be used. For purposes of illustration, the elemental detectors 16–32 are divided into three groups: the detectors 16–20 from the detector group 34, the detectors 22–26 from the detector group 36, and the detectors 28–32 from the detector group 38. It is to be understood, however, that a larger or smaller number of detector groups may be used and each of the detector groups 34–38 may contain a larger or smaller number of detectors. The outputs from each of the detectors 16–32 within a particular detector group are connected in the manner shown.

To permit frequency division multiplexing of the outputs of the detectors 16–32, a plurality of alternating voltage generators 40–44 is provided. The output from each of the alternating voltage generators 40-44 is delivered to a different elemental detector in each of the detector groups 34-38. For example, the output from the alternating voltage generator 40 is delivered to the detectors 16, 22 and 28, while the output from the alternating voltage generator 42 is delivered to the detectors 18, 24 and 30. Similarly, the output of the alternating voltage generator 44 is delivered to the detectors 20, 26 and 32.

The alternating voltage generators 40-44 operate at different carrier frequencies so that the frequencies of the bias voltages delivered to the elemental detectors 16-32 within each of the detector groups 40-44 is different. The incident electromagnetic radiation, changing the resistance of the elemental detectors 16-32, causes amplitude modulation of the detector outputs at a carrier frequency provided by the bias voltages provided by the alternating voltage generators 40-44. Accordingly, the frequency band occupied by the output of each elemental detector will be equal to the carrier frequency of the alternating voltage generator to which it is connected plus or minus the maximum radiometric input frequency of the incident electromagnetic radiation. By providing bias voltages having different frequences to the detectors 16-32, the frequency of the output currents of the elemental detectors within a particular group will be different. To ensure proper operation of the apparatus 10, the minimum frequency of the alternating voltage generators 40-44 should be greater than the maximum radiometric input frequency of the detectors 16-32, while the frequency of each of the alternating voltage generators 40-44 should ideally be separated from the frequency of the other alternating voltage generators 40-44 by more than twice the maximum detector radiometric input frequency.

Each detector group 34-38 communicates with one of a plurality of amplifiers 46-50. The amplifiers 46-50 have a low input impedance which permits crosstalk between the output of the detectors 16-32 to be minimized. The amplifiers 46-50 are preferably low noise wide band amplifiers.

The output current of each of the detectors 16-32 is an amplitude modulated signal consisting of individual signal components at the carrier frequency and at frequencies equal to the sum and difference of each radiometric input frequency with the carrier frequency. The outputs of each of the detectors 16-32 within a particular detector group 34-38 are connected at the low impedance input of the amplifiers 46-50 in the manner shown, and the output of each of the amplifiers 46-50 is therefore proportional to the sum of the amplifier input currents. Recovery of the individual radiometric input signal frequencies from the frequency division multiplexed signals of the amplifier outputs involves three steps. First, the outputs of the signals from the elemental detectors 16-32 providing inputs to each of the amplifiers 34-38 are separated. To separate the output signals from the elemental detectors 16-32, a plurality of band-pass filters are provided in which each band is centered on the individual carrier frequencies. The second step is demodulation (or detection) of the individual amplitude modulated carriers which are the band-pass filter outputs. The third step is low-pass filtering of the demodulator (or detector) outputs to remove unwanted results of the non-linear demodulation process (chiefly carrier frequency components) and yield low-noise output signals at the radiometric input signal frequences.

To provide means for band-pass filtering and demodulating the outputs from the detectors 16-32, the apparatus 10 further comprises a plurality of multipliers 52-68 arranged in three multiplier groups 88-92. Each of the multiplier groups 88-92 receive signal inputs from one of the amplifiers 46-50, and each of the multipliers 52-68 within a particular multiplier group receives a reference input from one of the alternating voltage generators 40-44. Each of the multipliers 52-68 therefore generates outputs having frequencies which are equal to the radiometric input signal frequencies of the detector whose bias voltage is the same as the reference voltage of that particular multiplier. Each of the outputs of the multipliers 52-68 also include frequencies which are the unwanted by-products of the multiplication process, as well as the frequency shifted outputs due to the outputs of the other detectors in the same detector group. While each of the multiplier groups 88-92 comprises three multipliers, it is to be understood that the number of multipliers in each group will in general be equal to the number of detectors in the detector group to which it is connected. In addition, other suitable means for band-pass filtering and demodulating the outputs from the detectors 16-32 may be used.

To provide means for filtering the output from the multipliers 52-68, the apparatus 10 further comprises a plurality of low-pass filters 70-86. The low-pass filter 70 is used to filter the output from the multiplier 52, while the low-pass filter 72 is used to filter the output of the multiplier 54. Similarly, the low-pass filters 74-86 are used to filter the output from the multipliers 56-68 respectively. The low-pass filters 70-86 permit passage of the radiometric input signal frequencies from the detectors 16-32 while substantially blocking or attenuating the unwanted by-products of the multiplication (or demodulation) process. By filtering the outputs of the multipliers 52-68 in this manner, the low-pass filters 70-86 operating in conjunction with the multipliers 52-68 are able to demodulate the output from the detectors 16-32. Although the low-pass filters 70-86 may each comprise an RC network, it is to be understood that other suitable means for filtering may be used.

The following example illustrates one method by which the present invention may be used. For purposes of illustration, it is assumed that the alternating voltage generator 44 is operating at a frequency of 1 MHz, the alternating voltage generator 42 is operating at 2 MHz, and the alternating voltage generator 40 is operating at a frequency of 3 MHz. In addition, it is assumed that the incident infrared radiation causes the resistance of the detectors 16-32 to vary at a frequency of 1 KHz. Under these operating conditions, the output of the detector 16 will be 3 MHz±1 KHz and 3 MHz. Similarly, the output for the detector 18 will be 2 MHz±1 KHz and 2 MHz, while the output of the detector 20 will be equal to 1 MHz±1 KHz and 1 MHz. These outputs are delivered to the multiplier 52 which also receives the output from the alternating voltage generator 40. Because the alternating voltage generator 40 operates with a reference frequency of 3 MHz, the output from the multiplier 52 will have frequencies equal to the sums and differences of 3 MHz and each individual signal input frequencies from the detectors 16-20. Accordingly, the output of the multiplier will have the following frequencies:

| OUTPUT OF THE MULTIPLIER 52 | | |
| --- | --- | --- |
| Source of Input Signal | Frequency of Input Signal | Frequency of Output Signal |
| Detector 16 | 3 MHz + 1KHz | 1 KHz |
|  | 3 MHz | 6 MHz + 1 KHz |
|  | 3 MHz − 1 KHz | 6 MHz |
|  |  | 1 KHz |
|  |  | 6 MHz − 1 KHz |
| Detector 18 | 2 MHz + 1 KHz | 1 MHz − 1 KHz |
|  | 2 MHz | 5 MHz + 1 KHz |
|  |  | 1 MHz |
|  | 2 MHz − 1 KHz | 5 MHz |
|  |  | 1 MHz + 1 KHz |
|  |  | 5 MHz − 1 KHz |
| Detector 20 | 1 MHz + 1 KHz | 2 MHz − 1 KHz |
|  | 1 MHz | 4 MHz + 1 KHz |
|  | 1 MHz − 1 KHz | 4 MHz |
|  |  | 2 MHz |
|  |  | 2 MHz + 1 KHz |
|  |  | 4 MHz − 1 KHz |

Because the low-pass filter 70 is able to exclude signals having a frequency above 1 KHz, it will be seen that only the signal corresponding to the 1 KHz radiometric input to detector 16 passes through the low-pass filter 70. Similarly, only the signal from the detector 18 will be able to pass through the low-pass filter 72 while the signal from the detector 20 is only able to pass through the low-pass filter 74. The detectors 22–32 operate in a similar manner.

It should be understood that the invention was described in connection with a particular example thereof. By using frequency division multiplexing, the number of conductors required to deliver signals from a detector array is reduced as the conductors used may carry the output from more than one elemental detector. Other modifications will become apparent to those skilled in the art after a study of the specifications, drawings and following claims.

What is claimed is:

1. An apparatus for sensing electromagnetic radiation comprising:
   a plurality of elemental detectors each operable to generate an output in response to receipt of electromagnetic radiation, said plurality of elemental detectors forming a plurality of detector groups, the elemental detectors in each of said detector groups being electrically connected; and
   means for frequency division multiplexing the outputs of said elemental detectors, said means for frequency division multiplexing comprising:
   (a) a plurality of alternating voltage generators each providing biasing potential to one of said elemental detectors in each of said detector groups, and
   (b) a plurality of demodulating circuits, each of said demodulating circuits continuously receiving the output from one of said detector groups and comprising a plurality of multipliers, each of said multipliers being electrically connected to one of said alternating voltage generators.

2. The apparatus of claim 1, wherein said means for frequency division multiplexing further comprises means for amplifying the outputs of said elemental detectors.

3. The apparatus of claim 2, wherein said means for frequency division multiplexing further comprises means for low-pass filtering the outputs of said demodulating circuits.

4. A method for sensing electromagnetic radiation comprising the steps of:
   permitting electromagnetic radiation to be received by a plurality of elemental detectors;
   biasing said elemental detectors with carrier frequency alternating voltage signals;
   permitting said element detectors to generate frequency division multiplexed signals; and
   continuously recovering said frequency division multiplexed signals from each of said elemental detectors by multiplying said frequency division multiplexed signals with said carrier frequency alternating voltage signals.

5. The method of claim 4, wherein said step of permitting said elemental detectors to generate frequency division multiplexed signals comprises the step of permitting said electromagnetic radiation to amplitude modulate said carrier frequency alternating voltage signals.

6. The method of claim 4, wherein said step of permitting said elemental detectors to generate frequency division multiplexed signals comprises the step of combining the outputs from said elemental detectors to generate said frequency division multiplexed signals.

7. The method of claim 4, wherein said plurality of elemental detectors forms a plurality of detector groups, and wherein said step of biasing said elemental detectors comprises the step of delivering the outputs from one of a plurality of alternating voltage generators to one of said elemental detectors in each of said plurality of detector groups.

8. The method of claim 7, wherein each of said alternating voltage generators produces output voltages at different frequencies.

9. The method of claim 4 wherein said step of continuously recovering said frequency division multiplexed signals comprises the step of delivering the frequency multiplexed signals from said elemental detectors to a plurality of multipliers.

10. The method of claim 9, wherein said step of continuously recovering said frequency division multiplexed signals comprises the step of delivering the output of said multipliers to a plurality of low-pass filters.

11. The method of claim 10, wherein each of said low-pass filters comprise an RC circuit.

12. An apparatus for sensing electromagnetic radiation comprising:
   a plurality of elemental detector groups, each of said elemental detector groups comprising a plurality of elemental detectors having outputs which are electrically connected;
   means for providing an alternating bias voltage to said elemental detectors;
   means for continuously band-pass filtering and demodulating the outputs from said elemental detectors, said means for band-pass filtering and demodulating comprising a plurality of multipliers, each of said multipliers being electrically connected to said means for providing an alternating bias voltage; and
   means for low-pass filtering the outputs from said means for band-pass filtering and demodulating.

13. The apparatus of claim 12, wherein said means for providing an alternating bias voltage to said elemental detectors is operable to provide a different bias voltage to each of the elemental detectors within a particular elemental detector group.

14. The apparatus of claim 12, wherein said means for providing alternating bias voltage to said elemental detectors comprises a plurality of alternating voltage generators.

15. The apparatus of claim 14, wherein said means for continuously band-pass filtering and demodulating comprises a plurality of multiplier groups, each of said multiplier groups comprising a plurality of multipliers.

16. The apparatus of claim 15, wherein each of said elemental detector groups are electrically connected with one of said multiplier groups.

17. The apparatus of claim 12, wherein said means for low-pass filtering comprises a plurality of RC networks.

* * * * *